Aug. 4, 1964 M. KUNZ 3,143,688

PROTECTIVE DEVICE

Filed April 15, 1960

MAX KUNZ
INVENTOR

BY Ralph E. Bitner.
ATTORNEY

United States Patent Office 3,143,688

Patented Aug. 4, 1964

3,143,688

PROTECTIVE DEVICE

Max Kunz, Norwalk, Conn., assignor to Raytheon Company, a corporation of Delaware Filed Apr. 15, 1960, Ser. No. 22,445
5 Claims. (Cl. 317—40)

This invention relates to a protective device which opens a circuit when the temperature of certain elements increases above a predetermined safe value. The invention has particular reference to a control means for permanently disconnecting an applied source of potential from circuit components so that subsequent cooling will not act to restore the circuit.

The circuit about to be described includes a number of semiconductor elements which may be diode rectifiers, transistors, silicon controlled rectifiers, and any other semiconductor devices which should not be heated above a predetermined temperature limit while carrying current in an operating circuit. One of the well-known devices for protecting such components is the bimetallic strip which is secured at one end and which operates contacts by the movement of its free end. This type of protective device has been used in many kinds of circuits but, in its usual application, as soon as the temperature is lowered after an opening of the contacts and a disruption of the current, the contacts will again close and the circuit will be connected as before. Such an operating characteristic is highly desirable in many applications, particularly in heating systems where a desired temperature is to be maintained. However, it has been found necessary in many applications of semiconductor components to permanently disconnect the source of power from the circuit containing the components. The present invention describes such an arrangement and after the bimetallic strip has operated its contacts, the circuit remains opened until a fuse element or a circuit breaker is manually restored.

One of the objects of this invention is to provide an improved protection device which avoids one or more of the disadvantages and limitations of prior art devices.

Another object of the invention is to provide a temperature sensitive circuit breaker which may be adjusted in value to disrupt the circuit at a predetermined desired temperature.

Another object of the invention is to permanently disrupt the applied source of potential from the circuit components regardless of subsequent temperatures.

Another object of the invention is to provide a common heat sink for all temperature sensitive elements so that a rise in temperature of any one or all of them will cause a circuit breaker to be operated.

The invention includes a protective device comprising a heat sink to which is secured a plurality of circuit components which may be damaged by an elevated temperature. A bimetallic temperature-sensitive strip is also secured to the heat sink and has contact means for operating a control circuit when the temperature exceeds the predetermined value. The control circuit includes the contact means operated by the strip, a source of electrical power, and a fuse; the fuse also being connected in series with the electrical supply line which connects the circuit components to their source of electrical power. When the fuse is melted due to the operation of the strip contacts, the components are permanently disconnected from their source of power.

For a better understanding of the present invention, together with other and further objects thereof, reference is made to the following description taken in connection with the accompanying drawings.

Figure 1:
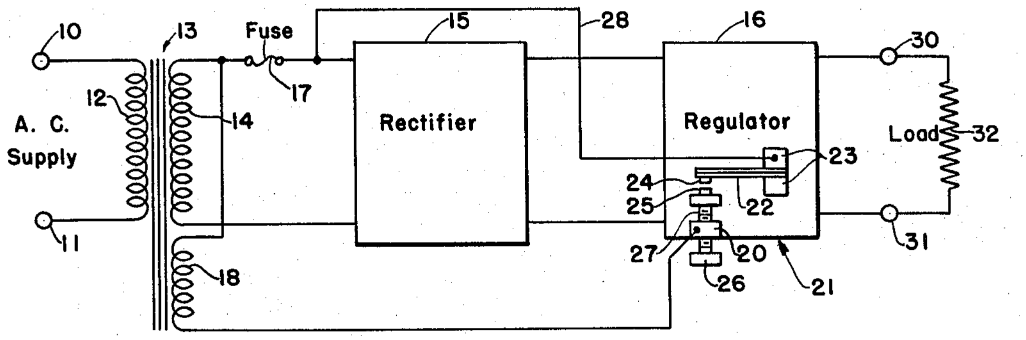
FIG. 1 is a schematic diagram of connections with some portions of the circuit shown in block form.

Referring now to FIG. 1, the circuit includes input terminals 10, 11, which are to be connected to a source of alternating current power. The power is applied to a primary winding 12 of a transformer 13 which includes a secondary winding 14 connected to a rectifier circuit 15 and a regulator circuit 16. A fuse 17 is connected in series between winding 14 and rectifier 15. Transformer 13 also includes a second secondary winding 18, one end of which is connected to one side of the fuse 17 and the other end of which is connected to a terminal post 20 which is part of a temperature-sensitive bimetallic strip device 21.

Device 21 includes a bimetallic strip 22 which is secured between supporting blocks 23 in contact with a heat sink. The other end of the bimetallic strip 22 supports a single contact 24 which, when heated, makes electrical connection with a second contact 25, adjustably supported by terminal 20. Adjustment of the contact position is made by a knurled knob 26 which operates a screw 27 and positions contact 25. The supporting blocks 23 are connected by means of conductor 28 to the other side of fuse 17 so that current is sent from winding 18 to the fuse 17 as soon as contacts 24 and 25 are brought into conductive relation with each other. The output of the regulator 16 is connected to output terminals 30 and 31 which are to be connected to a direct current load 32.

The operation of the circuit shown in FIG. 1 is as follows: Electrical power applied to input terminals 10, 11, is transferred by transformer 14 to the rectifier 15, then to the regulator 16, and load 32. During the normal operation of the circuit, the fuse 17 passes current and contacts 24, 25, are open because the bimetallic strip 22 normally runs at a temperature which holds the strip in a position which separates the contacts. Secondary winding 18 generates a voltage but does not produce any current since the terminal 20 and its associated contact 25 are not connected to any other portion of the circuit.

As long as the circuit runs at a temperature which will not damage any of the regulator components, the protective device will not operate, but as soon as the temperature of the components and the heat sink to which they are secured is raised above a predetermined safe value, the bimetallic strip 22 will move contact 24 into conductive relation with contact 25 and a high voltage from secondary winding 18 will be applied to fuse 17 melting it in a very short time interval and cutting off the power from secondary winding 14 to rectifier 15 and the regulator 16. After the fuse has been melted, it must be manually replaced before the circuit can again be put into normal operation.

Figure 2:
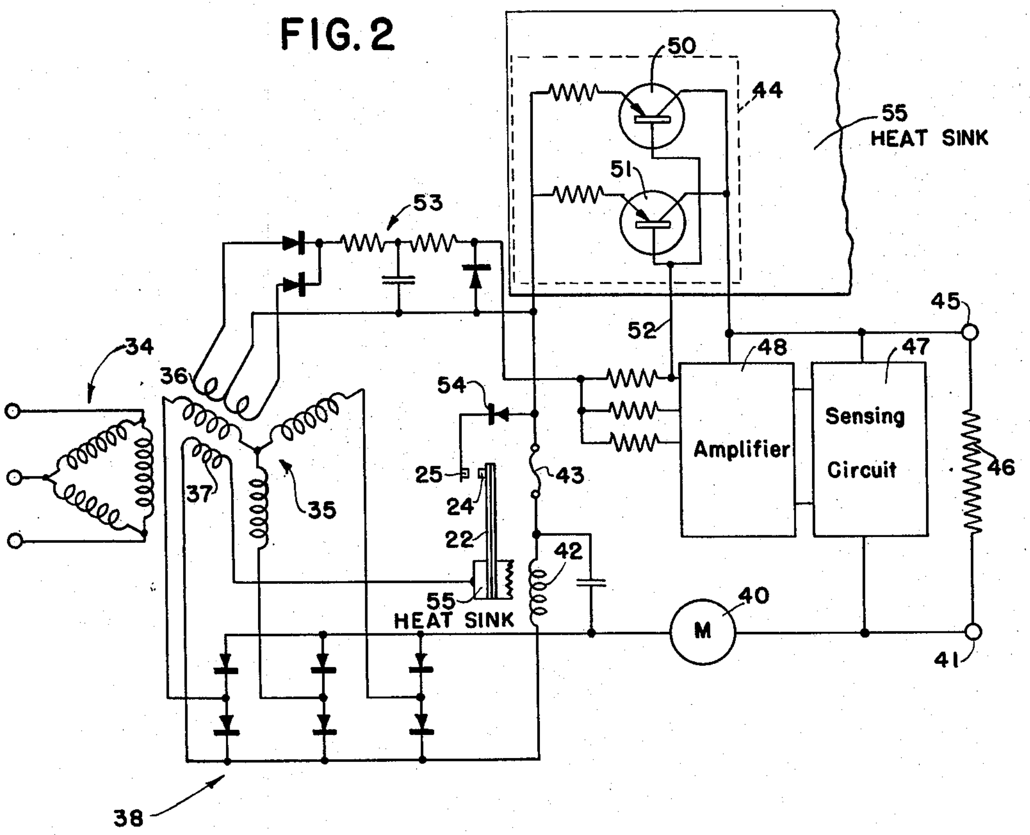
FIG. 2 is a circuit diagram similar to FIG. 1, showing how the invention can be applied to a voltage regulator circuit having a three-phase input and a single direct current load.

The circuit shown in FIG. 2 illustrates how the protective device may be applied to a more complex circuit. This circuit includes a three-phase winding 34, a three-phase secondary winding 35, and additional secondary winding 36 and 37. The main secondary windings 35 are applied to a rectifier array 38, one side of which is connected through a meter 40 to output terminal 41. The other side of the rectifier 38 is connected through an inductor 42, a fuse 43, a variable impedance circuit 44, and output terminal 45. Terminals 41 and 45 may be connected to a direct current load 46.

The regulator portion of this circuit includes a sensing circuit 47 which determines the error voltage above or below a desired value and an amplifier circuit 48 which amplifies the error voltage and applies it to the variable impedance portion of the circuit 44. In FIG. 2 the variable impedance circuit includes two transistors 50 and 51 in parallel, the resistances of which are controlled by the voltage sent by the amplifier circuit 48 over conductor 52 to the base electrodes of both transistors. Sensing circuit 47 and amplifier circuit 48 are shown in block form since these circuits are old in the art and need not be described in detail here. Power for the amplifier is derived from secondary winding 36 and rectifier-filter circuit 53.

The protective device is similar to the one shown in FIG. 1 and includes secondary winding 37, fuse 43, a rectifier 54, and contacts 25–24 which are operated by the bimetallic strip 22. Strip 22, as well as transistors 50 and 51, are secured to a portion of a heat sink 55. The operation of this protective device is the same as described in connection with FIG. 1. As soon as the passing transistors 50–51 are increased in temperature above the predetermined value, bimetallic strip 22 is operated and closes contacts 24, 25, thereby cutting off the power connection to the passing transistors and the load.

The foregoing disclosure and drawings are merely illustrative of the principles of this invention and are not to be interpreted in a limiting sense. The only limitations are to be determined from the scope of the appended claims.

I claim:

1. A protective device comprising, a plurality of circuit components which may be damaged by an elevated temperature above a predetermined value, said components secured to a common metal heat sink and in thermal contact therewith, a bimetallic temperature-sensitive strip also secured to said heat sink and having contact means for closing a circuit when the temperature exceeds said predetermined value; said circuit including in series connection, a first source of electrical power, said contact means, and a fuse; said fuse also connected in series with an electrical supply line which connects said circuit components to a second source of electrical power; whereby said fuse is melted when the contacts are closed and said second potential source is disconnected from the components.

2. A protective device for a rectifier circuit which receives alternating current power from a source and delivers direct current power to a load comprising, a plurality of circuit components which may be damaged by an elevated temperature above a predetermined value, said components secured to a common metal heat sink for dissipation of heat, a bimetallic temperature-sensitive element also secured to said heat sink and having normally open contacts which close when the temperature rises and complete a control circuit; said control circuit including, a first source of electrical power, said contact means, and a fuse; said fuse also connected in series with an electrical supply line which connects said circuit components to a second source of electrical power; whereby said fuse is melted when the contacts are closed and said second potential source is disconnected from the circuit components.

3. A protective device for a rectifier circuit which receives alternating current power from a source and delivers direct current power to a load comprising, a plurality of semiconductor circuit components which may be damaged by an elevated temperature above a predetermined value, said components secured to a common metal heat sink for dissipation of heat, a temperature-sensitive element also in thermal connection to said heat sink and controlling normally open electrical contacts which are adapted to close when the temperature rises; a control circuit including said contacts, a first source of electrical power, and a fuse; said fuse also connected in series with an electrical supply line which connects said circuit components to a second source of electrical power.

4. A protective device as set forth in claim 3 wherein a voltage regulator is connected to said rectifier and said regulator includes semiconductor circuit components in thermal connection with said heat sink.

5. A protective device as set forth in claim 4 wherein said semiconductor components in the regulator include three-electrode passing transistors.

References Cited in the file of this patent

UNITED STATES PATENTS

| | | |
|---|---|---|
| 1,924,906 | Bower | Aug. 29, 1933 |
| 2,370,037 | Hurst | Feb. 20, 1945 |
| 2,866,147 | Bichsel | Dec. 23, 1958 |
| 2,909,647 | Glenn | Oct. 20, 1959 |